Patented Jan. 30, 1934

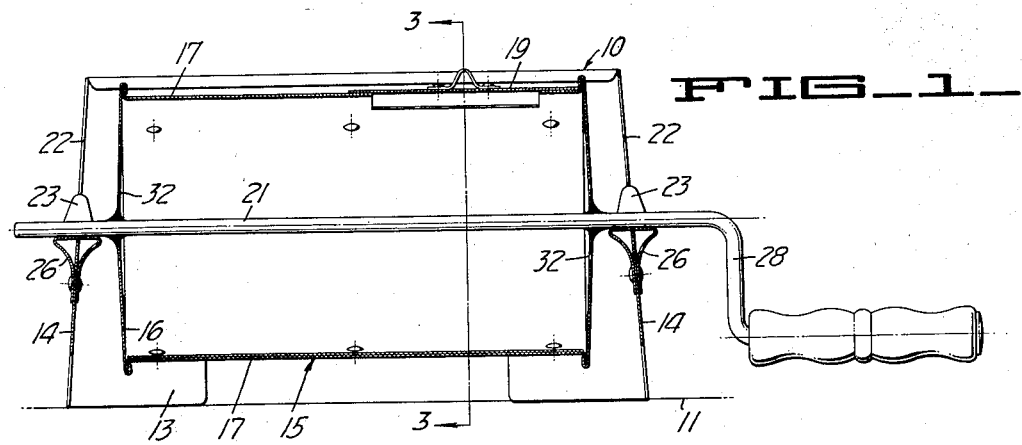
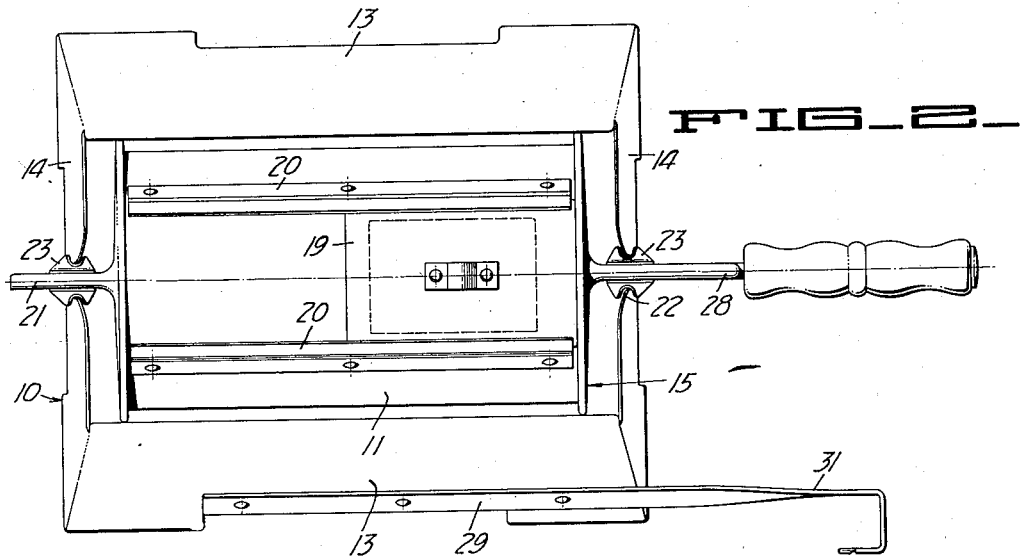
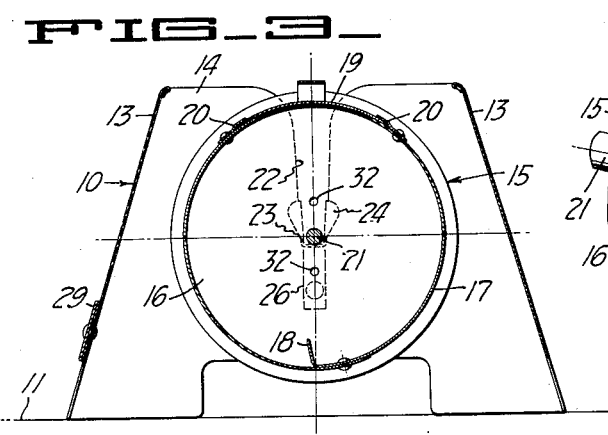
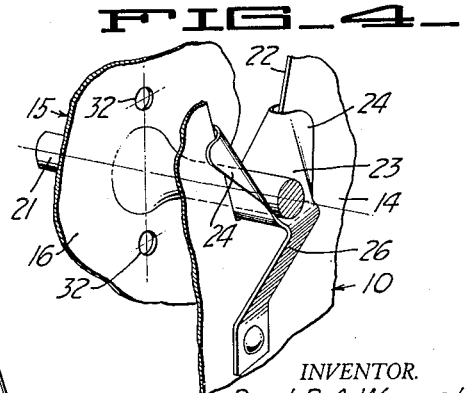

1,945,129

UNITED STATES PATENT OFFICE 1,945,129

COFFEE ROASTER

Paul R. A. Wessel, Burlingame, Calif.

Application July 22, 1933. Serial No. 681,748

3 Claims. (Cl. 34—5)

This invention relates generally to devices for roasting coffee, and particularly to devices intended for domestic use in conjunction with ordinary cooking ranges.

It is an object of the invention to provide a device of the above character which will not only make possible perfect roasting of small quantities of coffee, but which would also be self-lubricating in its operation.

A further object of the invention is to provide a coffee roasting device for domestic use which will be simple in construction, relatively cheap to manufacture and simple to manipulate.

Further objects of the invention will appear from the following description in which the preferred embodiment of the invention is set forth in detail in conjunction with the accompanying drawing.

Referring to the drawing:

Figure 1 is a side elevational view, in cross section, illustrating a device constructed in accordance with the present invention.

Fig. 2 is a plan view of the device shown in Fig. 1.

Fig. 3 is a cross sectional view taken along the line 3—3 of Fig. 1.

Fig. 4 is a detail, in perspective, illustrating the manner in which my device is made self-lubricating.

The device as illustrated in the drawing consists of a heat concentrator 10, which is adapted to rest upon the top 11 of an ordinary cooking range, above a source of heat such as a gas burner or electrical heating element. The concentrator consists of upwardly convergent side and end walls 13 and 14, which are imperforate and made of suitable material such as sheet metal. The preferred form for this concentrator can be best described as stating that it is substantially a four-sided truncated pyramid.

Adapted to be positioned within the concentrator 10, there is a drum 15 which is made of suitable heat conducting material, such as sheet metal. In the form illustrated the drum consists of end walls 16 and substantially cylindrical side walls 17. A longitudinal vane 18 may be provided within the drum to insure adequate agitation and intermixing of the coffee. To enable introduction and removal of coffee, the drum is provided with a slidable closure 19, retained by the guide strips 20. The drum is secured to an axial shaft 21, and the projecting end portions of this shaft are accommodated within slots 22 formed in the end walls 14, and rest upon journals 23 formed at the lower ends of the slots. A suitable construction for these journals 23 is illustrated in detail in Fig. 4. Each journal is formed of a piece of sheet metal, bent U-shaped to fit the associated slot 22, and retained in proper position by the ears 24 in conjunction with the depending tab 26. With such journal the surfaces engaged by the end portions of the shaft are obviously of considerable area compared to the thickness of the end walls 14. A suitable crank 28 is formed upon one end of the shaft 21, to facilitate manual rotation of the drum.

Secured to one side of the concentrator there is a metal strap 29 the projecting end portion 31 of which is shown bent hook-shaped to facilitate grasping by an operator. By grasping this projecting portion 31 with one hand, the operator may steady and retain the device in proper position upon the range, leaving the other hand free to turn the crank 28.

With a device as described above it is not feasible to provide ordinary lubricating oil for the journals 23, not only because exposed oiled surfaces upon household appliances is always objectionable, but likewise because the journals are heated to a considerable degree during operation of the device. I have discovered that the vapors evolved from the coffee during roasting of the same, if discharged upon the journals, will afford adequate lubrication to avoid objectionable noise during rotation of the drum. This is apparently due to the fact that the vapors are oily in nature, and also carry a certain amount of the oily silver skin from the coffee which is deposited upon a surface against which the vapors are directed. Thus in my device the drum 15 is made substantially imperforate, except for the vents 32 in the end walls 16 of the drum, which are adjacent to the shaft 21. Because of the location of these vents, vapors discharged from the same carrying a certain amount of the silver skin, are contacted with the journals 23 and the end portions of the shaft 21, to provide adequate lubrication.

Operation of my device can be briefly reviewed as follows:—The heat concentrator 10 is positioned upon top of a cooking range, above a fuel burner or electrical heating element. A quantity of coffee is inserted in drum 15, and this drum is then positioned within the concentrator as shown in Figs. 1 and 2. The operator now continuously turns crank 28 so that the coffee is uniformly heated. Hot gas from the source of heat passes upwardly within the concentrator, and is discharged thru the spaces between the side walls 13 and the sides of the drum, and between the end walls 14 and the ends of the drum. In this connection it will be noted that the spaces between the side walls 13 and the side walls of the drum, and likewise the spaces between the end walls 14 and the ends of the drum form open-ended flues or passages for flow of hot gas. Thus hot gas is distributed substantially entirely about the drum, so that the heat is efficiently and uniformly transmitted to the drum and its contents. While the coffee is being roasted vapors which jet from the vents 32 effect adequate lubrication of the journals 23 to avoid squeaking. Due to the fact that the major part of the drum is imperforate, hot gases from the source of heat cannot directly contact the coffee, and thus the possibility of searing or contamination by gaseous odors is avoided.

I claim:

1. In a coffee roaster, a heat concentrator adapted to be disposed above a source of heat, a drum for containing coffee to be roasted, and means including journals carried by said concentrator for supporting said drum for axial rotation, said drum having vents for the discharge of vapor and silver skin upon said journals to lubricate the same and being otherwise substantially imperforate.

2. In a coffee roaster, a heat concentrator adapted to be disposed above a source of heat, a drum for containing coffee to be roasted, a shaft having end portions extending outwardly from the ends of the drum, and journals carried by the concentrator for supporting said drum for axial rotation, said drum having vents for the discharge of oily vapor and silver skin upon said journals to lubricate the same and being otherwise substantially imperforate.

3. In a coffee roaster, a heat concentrator adapted to be disposed above a source of heat, a drum for containing coffee to be roasted, a shaft having end portions extending outwardly from the ends of the drum axially of the same, journals carried by the concentrator for rotatably supporting said end portions of the shaft, the end walls of said drum being imperforate but provided with vents adjacent said shaft for the discharge of oily vapor and silver skin upon said journals to lubricate the same, the remainder of the drum being substantially imperforate.

PAUL R. A. WESSEL.